United States Patent [19]
Amies

[11] 3,861,209
[45] Jan. 21, 1975

[54] LOW PRESSURE TEST FOR RESERVOIR LEVEL SYSTEM

[75] Inventor: Gerald E. Amies, St. Louis, Mo.

[73] Assignee: The United States of America as represented by the Secretary of the United States Air Force, Washington, D.C.

[22] Filed: Dec. 11, 1973

[21] Appl. No.: 423,845

[52] U.S. Cl. .................................. 73/168, 73/40
[51] Int. Cl. .......................................... G01m 3/26
[58] Field of Search ............... 73/40.5 R, 40, 168; 116/70; 137/456, 459, 460, 503, 87

[56] References Cited
UNITED STATES PATENTS
2,744,533  5/1956  Parker ................................. 137/87
3,568,705  3/1971  Boyadjieff et al ............... 137/460 X

*Primary Examiner*—Charles A. Ruehl
*Attorney, Agent, or Firm*—Harry A. Herbert, Jr.; Arsen Tashjian

[57] ABSTRACT

A device for shutting off one or more branch circuits of a hydraulic system following loss of fluid from the system. During the shut off period, the device tests the branch circuit for leakage and when the leakage exceeds a preset value, the branch circuit is locked out allowing the remaining circuits to be switched on again.

2 Claims, 1 Drawing Figure

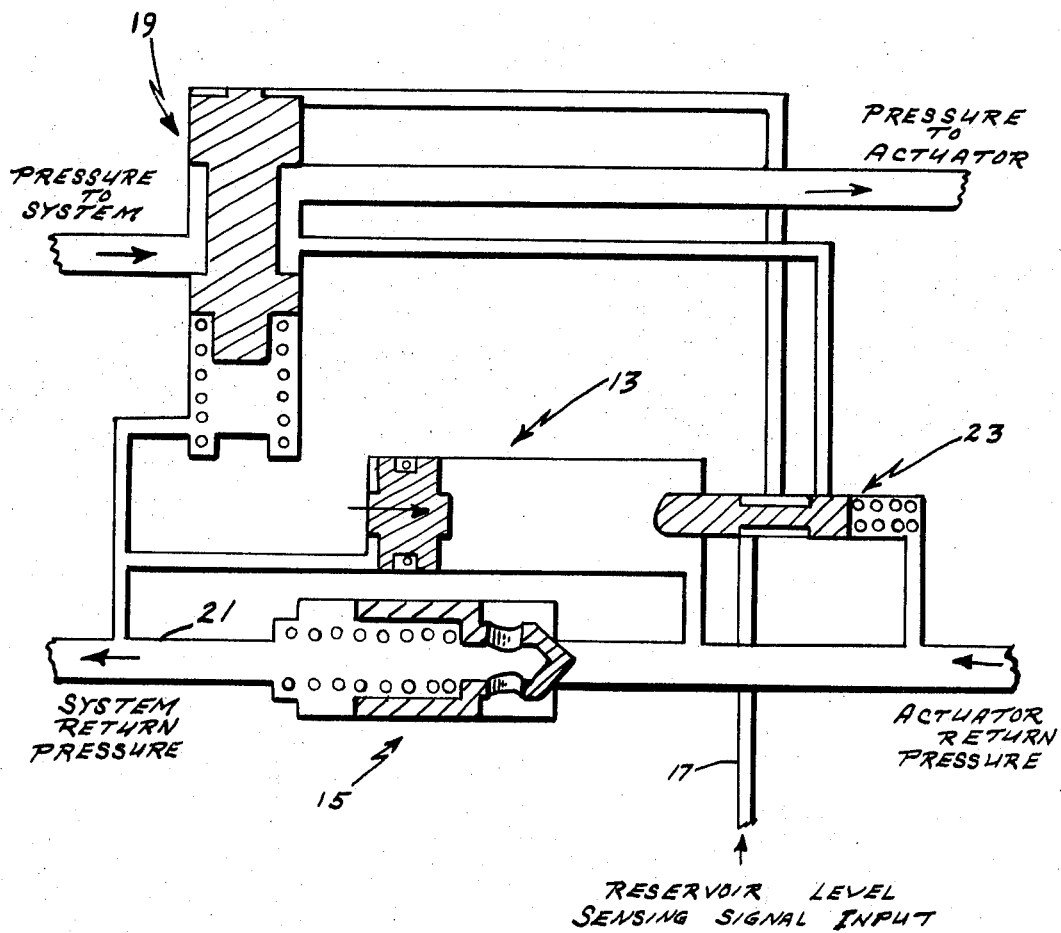

LOW PRESSURE TEST FOR RESERVOIR LEVEL SYSTEM

BACKGROUND OF THE INVENTION

This invention relates to a device for isolating failure in an aircraft hydraulic system and, more particularly, the invention is concerned with providing a low pressure test to sense leakage while in flight and automatically isolate the branch circuit having the leak with a minimum loss of fluid during the leakage test.

The need for automatic failure isolation in aircraft hydraulic systems has become more pronounced as military aircraft have become subject to high performance requirements and high risk combat situations. Many aircraft are lost because a single hit or operational failure has caused the loss of the entire hydraulic control system or systems. If it were possible to reliably seal off that portion of the system in which the failure has occurred, the remainder of the hydraulic system would remain operative. The isolation of a hydraulic failure would make possible the return of the aircraft and pilot or at least enable the pilot to fly the aircraft to friendly territory for ejection purposes. The isolation device must be of such reliability that its insertion into the hydraulic system does not significantly reduce the overall system reliability because of inadvertent closure.

SUMMARY OF THE INVENTION

The present invention is concerned with providing a low pressure test for reservoir level sensing wherein one or more branch circuits of a hydraulic system are shut off following loss of fluid from the system. The branch circuits are tested for leakage during the shut off period and, where leakage exceeds a preset value, the branch circuit becomes locked out allowing the remaining circuits to be switched on again.

Accordingly it is an object of the invention to provide a hydraulic system with a pressure test piston which reacts to a pressure drop caused by leakage in a sub-system and operates a latching valve to prevent reconnection of the sub-system.

Another object of the invention is to provide a device for shutting off one or more branches circuits of a hydraulic system by causing a latching valve to automatically isolate any branch circuit following discovery of leakage therein.

Still another object of the invention is to provide a hydraulic system wherein the pressure drop across a check valve serves to hold a pressure test piston away from a latching valve until leakage is present in a sub-system circuit.

A further object of the invention is to provide a hydraulic system wherein a shut off valve closes in response to a reservoir level sensing signal activated by a leak in a sub-system causing the system return pressure to stroke a pressure test piston which operates a latching valve to prevent reconnection of the leaking sub-system. A pressure switch can be used to indicate that the system is locked out.

These and other objects, features and advantages will become more apparent after considering the following detailed description taken in conjunction with the annexed drawing and appended claims.

BRIEF DESCRIPTION OF THE DRAWING

The FIGURE is a schematic view of the low pressure test for reservoir level system according to the invention showing the pressure test piston being held in position by the pressure drop across the check valve.

DESCRIPTION OF A PREFERRED EMBODIMENT

Referring now to the FIGURE, a pressure test piston 13 is held at the end shown by the pressure drop across the check valve 15. When a reservoir level sensing signal input is applied at 17, the shut off valve 19 closes and, if leakage is present in a sub-system, the system return pressure at 21 will stroke the pressure test piston 13.

The test piston 13 will finally operate the latching valve 23 which will prevent reconnection of the sub-system. A pressure switch (not shown) can be used to indicate that the system is locked out and has lost pressure. Reconnection will take place when the system pressure is removed.

Thus, it can be seen that the device is not sensitive to system dynamics, flow transients, pressure surges, etc., and is capable of shut off of branch circuits with a loss of only 4 cubic inches of fluid, following the initial loss which caused the reservoir level decrease to the minimum level.

Also, it should be noted that the device can be used in any multi-branch system where leak detection and shut off is of benefit especially where the branch circuit volume is normally constant. Particular advantages of the system include its use in flight of a low pressure test to sense leakage and automatic isolation of the branch circuit following discovery of a branch circuit leak. Also, the device features a very low fluid volume loss during the leakage testing procedure.

Although the invention has been illustrated and described in terms of a preferred embodiment thereof, it will be apparent to those skilled in the art that certain changes, modifications and substitutions can be made, particularly with respect to the positioning and arrangement of the various valves and pistons, without departing from the true spirit and scope of the appended claims.

Having thus set forth and disclosed the nature of my invention, what I claim and desire to secure by Letters Patent of the United States is:

1. A low pressure test for hydraulic system reservoir level sensing automatically in aircraft while in flight comprising, a check valve positioned in a return pressure line and responsive to pressure changes therein, a pressure test piston in parallel relationship to said check valve, a shut off valve responsive to a rapid pressure drop in the hydraulic system of the aircraft, and a latching valve operatively engageable with said pressure test piston such that leakage in a sub-system of the aircraft hydraulic system lowers the reservoir level and produces a signal to energize said shut off valve causing the system return pressure to stroke said pressure test piston thereby operating said latching valve to prevent reconnection of the leaking sub-system.

2. The low pressure test for hydraulic system reservoir level sensing defined in claim 1 wherein said pressure test piston is held in the unstroked position by a pressure drop across said check valve.

* * * * *